United States Patent [19]
Petrak

[11] Patent Number: 5,123,513
[45] Date of Patent: Jun. 23, 1992

[54] REMOTE-ACTIVATED, POWER SHIFT CLUTCH ASSEMBLY WITH POSITIVE LOCKING

[75] Inventor: Harry A. Petrak, Boulder, Colo.

[73] Assignee: Boulder 12 Investments, Boulder, Colo.

[21] Appl. No.: 642,209

[22] Filed: Jan. 15, 1991

Related U.S. Application Data

[63] Continuation-in-part of Ser. No. 491,736, Mar. 12, 1990, Pat. No. 5,044,479.

[51] Int. Cl.$^5$ .................................................. F16D 25/04
[52] U.S. Cl. ................................ 192/85 CA; 192/49; 192/88 A; 192/86; 180/247
[58] Field of Search ............ 192/49, 50, 85 CA, 88 A, 192/86; 403/1; 180/247

[56] References Cited

U.S. PATENT DOCUMENTS

| | | | |
|---|---|---|---|
| 1,795,018 | 3/1931 | Foster et al. | 192/85 CA |
| 4,192,411 | 3/1980 | Fogelburg | 192/49 |
| 4,327,821 | 5/1982 | Telford | 192/49 |
| 4,381,828 | 5/1983 | Lunn et al. | 180/247 |
| 4,407,387 | 10/1983 | Lindbert | 180/247 |
| 4,452,331 | 6/1984 | Lunn et al. | 180/247 |
| 4,557,358 | 12/1985 | Petrak | 192/35 |
| 4,627,512 | 12/1986 | Clohessy | 180/247 |
| 4,694,943 | 9/1987 | Petrak | 192/35 |
| 4,775,040 | 10/1988 | Telford | 192/67 P |
| 4,787,491 | 11/1988 | Kato | 192/50 |

Primary Examiner—Rodney H. Bonck
Assistant Examiner—Nicholas Whitelaw
Attorney, Agent, or Firm—John E. Reilly

[57] ABSTRACT

A clutch assembly for automotive vehicle four-wheel drives either in association with an axle disconnect or wheel hub incorporates a power shift mechanism which can be remotely activated either when the vehicle is static, in motion and during either forward or reverse direction of movement to positively drive the clutch members into and out of engagement with one another. The power shift mechanism includes sealed envelopes in the form of expandable and contractable compartments which in response to a remote control valve will positively shift the clutch members into and out of engagement, and the members will remain in the shifted position without the continued application of force until positively shifted away from that position by the power shift mechanism. In the alternative, a spool-like shifter may be utilized with positive locking elements which will lock the clutch members in the engaged and disengaged position at the end of travel of the shift mechanism.

16 Claims, 12 Drawing Sheets

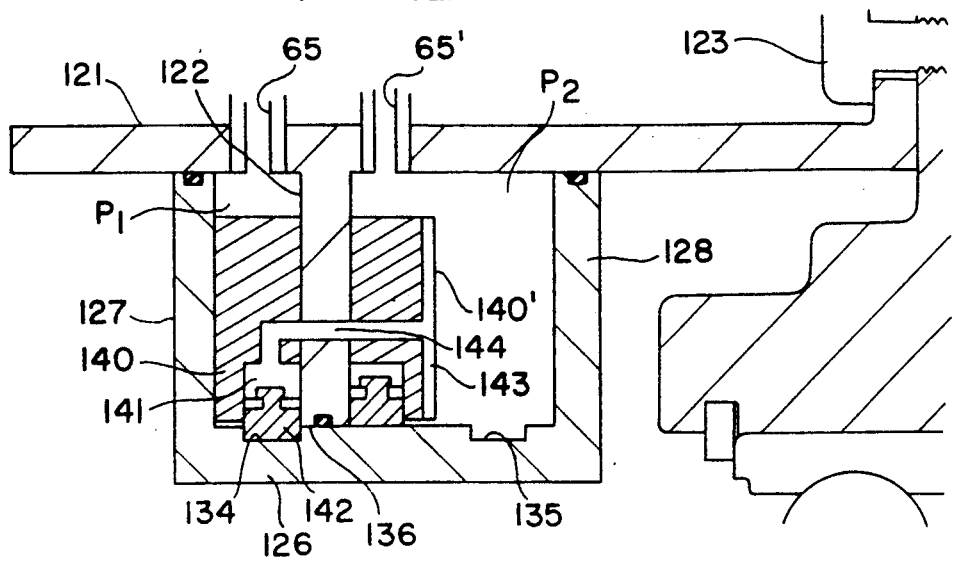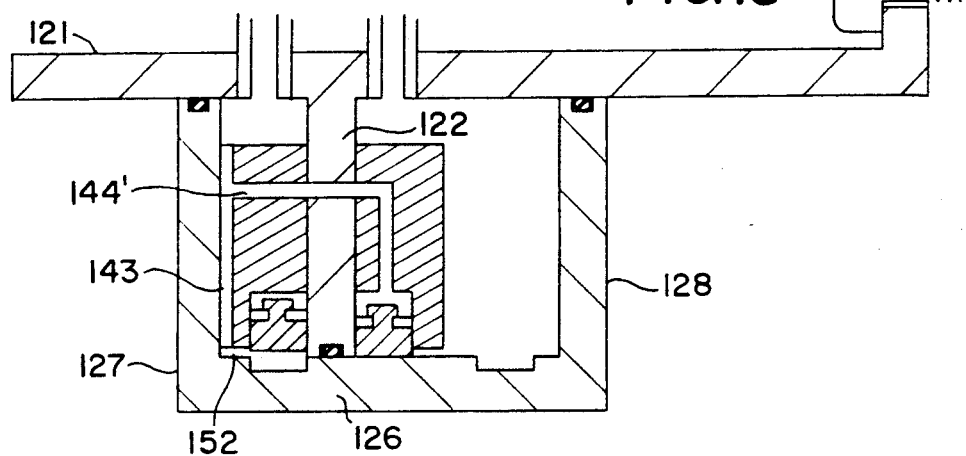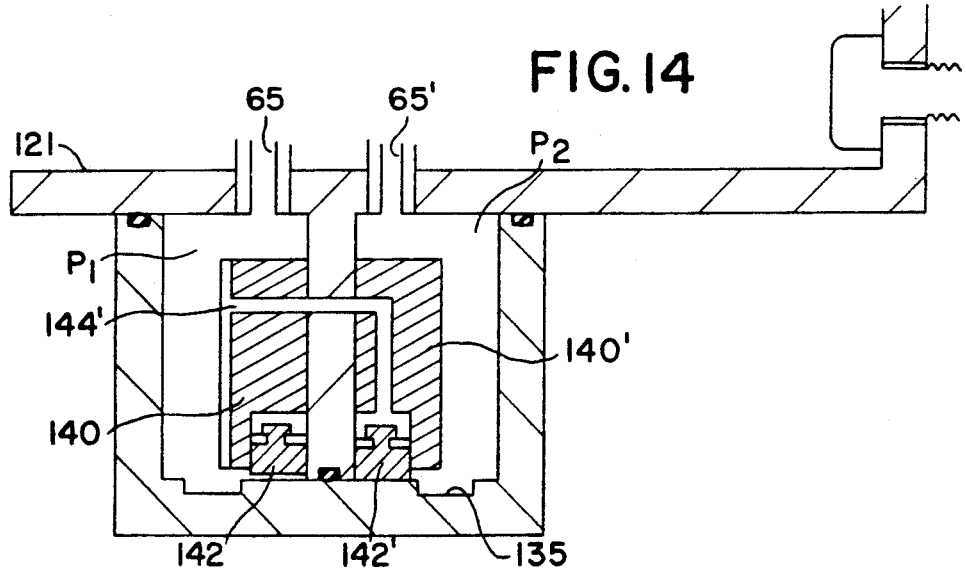

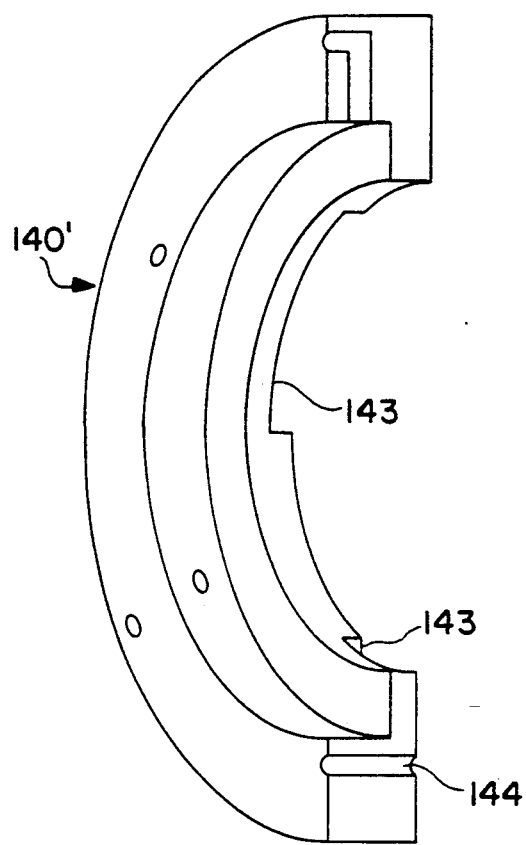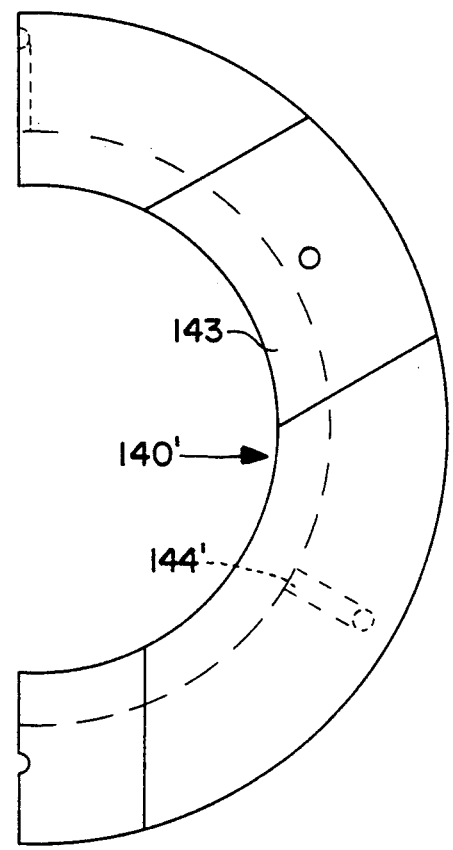
FIG. 15A  FIG. 15B
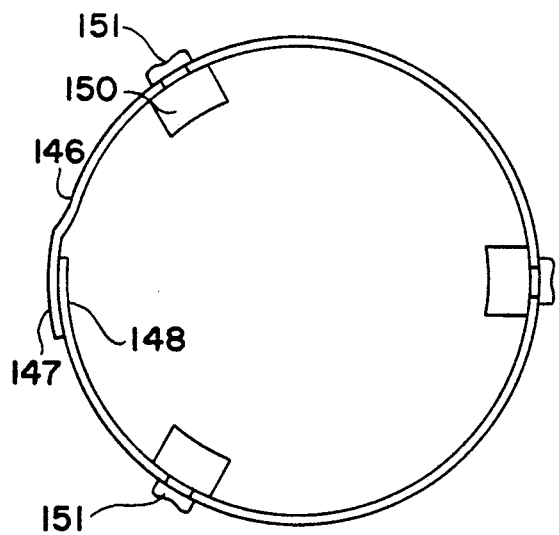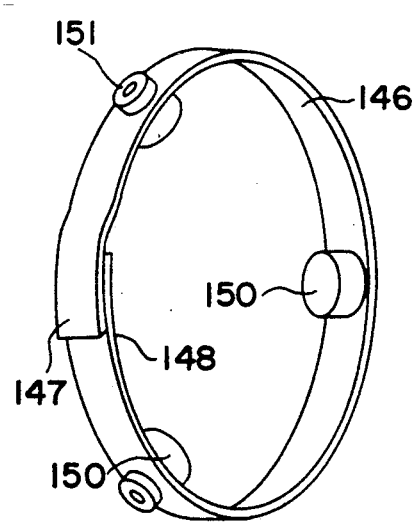
FIG. 16A  FIG. 16B

FIG. 17
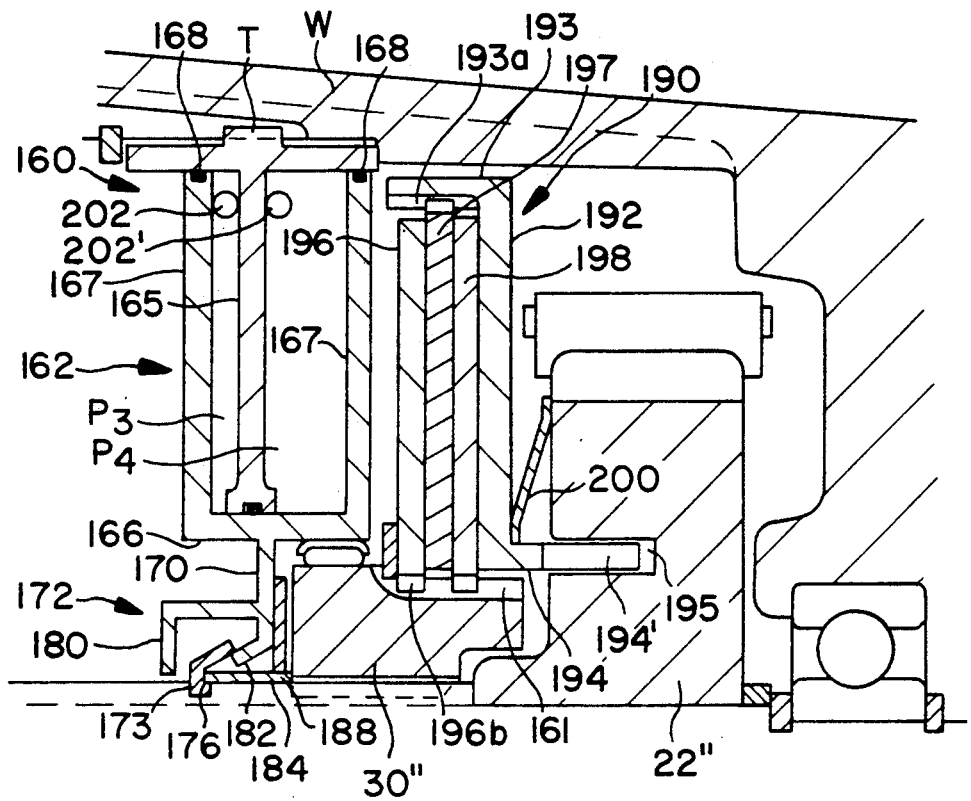
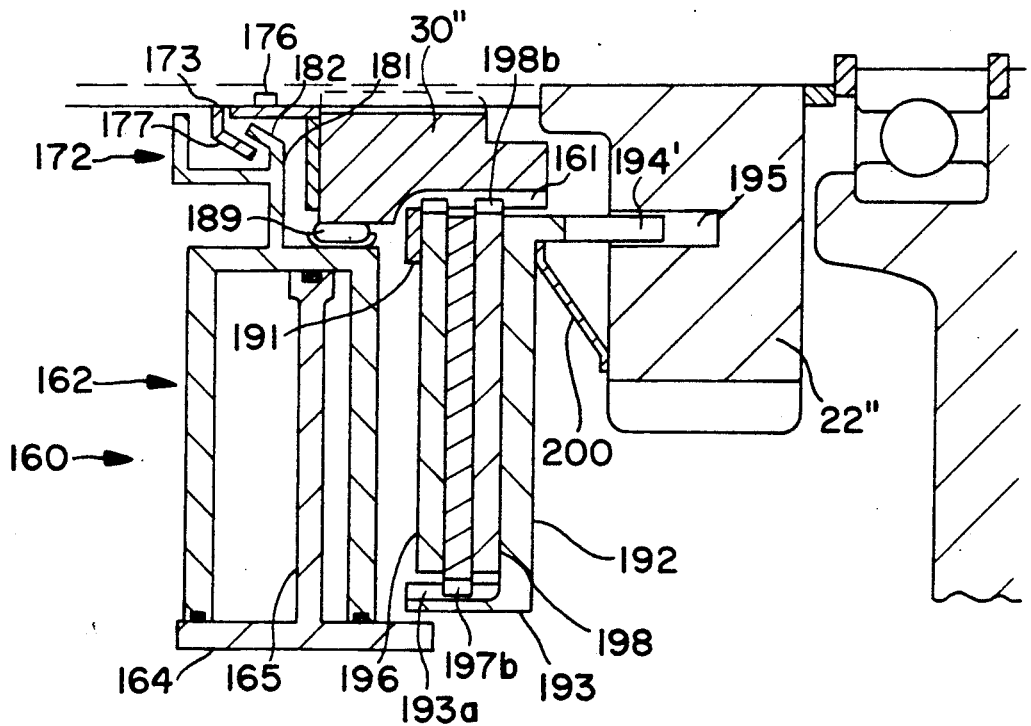

REMOTE-ACTIVATED, POWER SHIFT CLUTCH ASSEMBLY WITH POSITIVE LOCKING2

CROSS-REFERENCE TO RELATED APPLICATIONS

This application is a continuation-in-part of Ser. No. 491,736, filed Mar. 12, 1990 for REMOTE-ACTIVATED, POWER SHIFT CLUTCH ASSEMBLY, by Harry A. Petrak, now U.S. Pat. No. 5,044,479, and assigned to the assignee of the present invention.

This invention relates to clutch mechanisms; and more particularly relates to an improved clutch assembly for automatically engaging and disengaging the ground-engaging wheels of a motor vehicle with positive locking in either position.

BACKGROUND OF FIELD OF THE INVENTION

There is set forth and described in my prior U.S. Pat. No. 4,694,943, a novel and improved means for converting a drive system of a vehicle between two-wheel and four-wheel drive and in such a way as to establish dynamic engagement or disengagement of a clutch assembly by remote activation. That system was designed to overcome problems associated with the prior art systems which are capable of maintaining four-wheel drive only when the engine is running.

It is recognized that a clutch engaging or disengaging under applied torque must provide high linear or axial forces to assure sufficient penetration of the teeth on a clutch or high interface forces on friction drive clutches. In the case of gear-type clutches, insufficient or only gear tip penetration under torque will tend to destroy the gears. Moreover, when a vehicle is loaded or has variable tire sizes or pressures, or is used off-highway, the engaged components of the power train are subjected to wind-up torque lock. Thus, the force necessary to separate the clutch gears is often greater than the original force required for engagement.

In addition, it has been proposed to employ vacuum systems as a means of engagement and disengagement of the clutch gears. However, such systems have not been entirely satisfactory from the standpoint of meeting the force and loading requirements in effecting engagement and disengagement. Among other problems, the applied vacuum within the wheel envelope must be maintained continuously during four-wheel drive operation and can impose external atmospheric pressures on the wheel seals beyond the capability of the seals.

It has also been proposed to employ an electrical heating unit to expand a chambered gas for driving a piston which then drives a fork against a clutch gear. However, among other things, systems of this type do not always function quickly and can be affected by wide swings in temperatures.

In utilizing a power shift mechanism, it is also desirable to employ a releasable detent to retain the clutch members in the position to which driven by the shift mechanism even after the power has been shut off or removed. However, certain applications require more positive locking to maintain a selected shift position than is possible through utilization of a releasable detent; or, in other words, a locking mechanism which requires both positive locking and unlocking so as to avoid accidental release when the power or pressure has been removed. For example, the shafts and gears within a transfer case may be subjected to intermittent linear forces and dictate the need for automatic, but positive unlocking and relocking.

In U.S. Pat. Nos. 4,293,061 to Brown and 4,627,512 to Clohessy, power shift mechanisms are provided and which are mounted coaxially with respect to the clutch members but are powered in one direction only and must overcome a spring force acting in the opposite direction. In the '061 patent to Brown, it is necessary to compress the air in an envelope in order to shift in the one direction and the reverse spring pressure must then create a vacuum in order to return the envelope to its original state; and in both it is necessary to apply a continuous pressure or vacuum to maintain the clutch members in the engaged mode. U.S. Pat. Nos. 2,913,929 to Anderson and 4,271,722 to Campbell generally rely upon a power shift mechanism to effect engagement and disengagement of a clutch member but are not mounted coaxially with respect to the clutch member. Other representative patents in this field are U.S. Pat. Nos. 3,123,169 to Young et al and 3,050,321 to Howe et al.

SUMMARY OF THE INVENTION

It is therefore an object of the present invention to provide for a novel and improved clutch assembly which can be positively engaged and disengaged by remote activation in a highly efficient and reliable manner; and specifically wherein a clutch assembly is adaptable for use in effecting dynamic engagement and disengagement of one or both of the front or rear ground-engaging wheels of a four-wheel drive vehicle.

It is another object of the present invention to provide for positive, dynamic engagement and disengagement of an axle disconnect or wheel clutch mechanism either while the vehicle is static, in motion, or in response to remote operator control and during either forward or reverse direction of movement of the vehicle, and wherein engagement and disengagement can be effected independently of the application of torque between the driving and driven elements.

A further object of the present invention is to provide for a novel and improved method and means for effecting positive engagement and disengagement of a clutch mechanism employed in a four-wheel drive vehicle which is under the complete control of the operator at all times, will not accidentally shift as a result of engine shut-off or stall, sudden temperature or atmospheric changes or other exterior influences; and further wherein the clutch mechanism places the main driving force member on the same axis as the drive and driven clutching members or gears so as to establish circumferentially uniform axial clutching forces to avoid cocking, transverse wedging and high torque application to the gear sections.

A still further object of the present invention is to establish dynamic engagement or disengagement of a clutch assembly by remote activation and through the utilization of coaxially located, expandable and contractable power shift pressurizable compartments whereby under the pressurized expansion of one compartment the alternate compartment will contract proportionately to the expanding compartment enabling the total cubic displacement of the combined compartments to remain a constant in selectively driving clutch members to and from engagement.

It is an additional object of the present invention to provide for positive but remote activation of a clutch mechanism for selectively converting a motor vehicle between two-wheel and four-wheel drive modes in such a way as to avoid damage to the wheel seals or axle envelopes, is readily conformable to existing vehicle designs and can employ existing pressure sources on the vehicle as a means of remote activation of the clutch mechanism; and further wherein the clutch mechanism is positively locked and unlocked in the shifted position in a novel and improved manner.

In accordance with the present invention, a remote-activated clutch assembly for effecting positive engagement and disengagement between a first rotatable drive member and second member to be driven in which an axially displaceable clutch member is keyed for rotation to the first drive member and a second clutch member is drivingly connected to the second member to be driven; the first clutch member is movable into and out of intermeshing engagement with the second clutch member, pressure-responsive shift means being associated with the first clutch member and which includes a pressure chamber(s) expandable and contractable in axial directions toward and away from the second clutch member, and fluid pressure-operated means for applying positive pressure to the shifting means and positively advancing the first clutch member into and out of engagement with the second clutch member.

A preferred form of the present invention resides in a remote activated, positive fluid pressure-operated system for converting a vehicle between two-wheel drive and four-wheel drive wherein drive means are provided for selectively and positively rotating a drive shaft for a ground-engaging wheel to be driven, the clutch assembly comprising a receiver gear drivingly connected to the ground-engaging wheel to be driven, a drive gear mounted for rotation with the drive shaft and axially movable with respect to the drive shaft into and out of engagement with the receiver gear, fluid pressure-responsive shift means engageable with the drive gear, and fluid pressure operated activating means for applying positive pressure to the shift means for positively advancing the drive gear into and out of engagement with the receiver gear in converting between two-wheel and four-wheel drive. The preferred form of invention is capable of utilizing the energy and force available from existing pressure pumps on the vehicle, such as, power steering pumps or vacuum brake assist motors as well as existing shift actuators on the vehicle to control the power shift means. Either one or two assemblies per vehicle may be utilized depending on whether it is incorporated as a part of the axle disconnect at an axle location or a hub lock at a wheel hub location or at other locations along the vehicle power train; and, regardless of location, is compatible with other components within the power train so that shifting may be sequenced preceding, simultaneously with, or subsequent to torque application to the train or utilize a different sequence for engagement than for disengagement to relieve functions of other power train components.

In the preferred form, the shift means comprises co-axially located, expandable and contractable compartments separated by a fixed wall, and the compartments cooperatively expand and contract so that with the pressurized expansion of one compartment the coaxially located alternate compartment contracts in proportion to the expansion of the one compartment thereby enabling the total cubic displacement of the combined compartments to remain constant during the shift operation; and in shifting an integrated linear shift drive means is coaxially located with respect to the clutch members and driven axially in reverse or opposite directions depending upon which chamber is expanded. The shift means further works in cooperation with a releasable detent which will releasably retain tee clutch members in the position to which driven by the shift means independently of releasing the pressure in either compartment.

In certain applications, it is desirable to provide for positive locking of the clutch members either in the engaged or disengaged positions, such as, for example, in a transfer case which is subjected to intermittent linear or axial forces or where torque is transferred via friction plates under substantial biased counterforces. Positive locking can be achieved in accordance with alternate forms of the present invention either internally or externally of the shift mechanism in order to lock and hold the clutch members against accidental release after the fluid pressure employed in the shift mechanism has been reduced or removed; and positive release is achieved by making the locking mechanism responsive to the pressure applied in shifting in either direction as a preliminary to engagement and disengagment of the clutch members.

The above and other objects, advantages and features of the present invention will become more readily understood and appreciated from a consideration of the following detailed description of a preferred embodiment of the present invention when taken together with the accompanying drawings in which:

BRIEF DESCRIPTION OF THE DRAWINGS

FIGS. 12, 13 and 14 are more detailed sectional views of a portion of the power shift mechanism and illustrating its movement into and out of locking engagement;

FIGS. 15A and 15B are isometric and elevational views, respectively, of one of the locking members of the modified form of power shift assembly;

FIGS. 16A and 16B are isometric and elevational views, respectively, of the limit stop mechanism forming a part of the power shift assembly of FIG. 11;

FIG. 17 a sectional view of another form of power shift assembly in accordance with the present invention shown in the engaged and disengaged positions;

DETAILED DESCRIPTION OF THE PREFERRED EMBODIMENT

Figure 2:
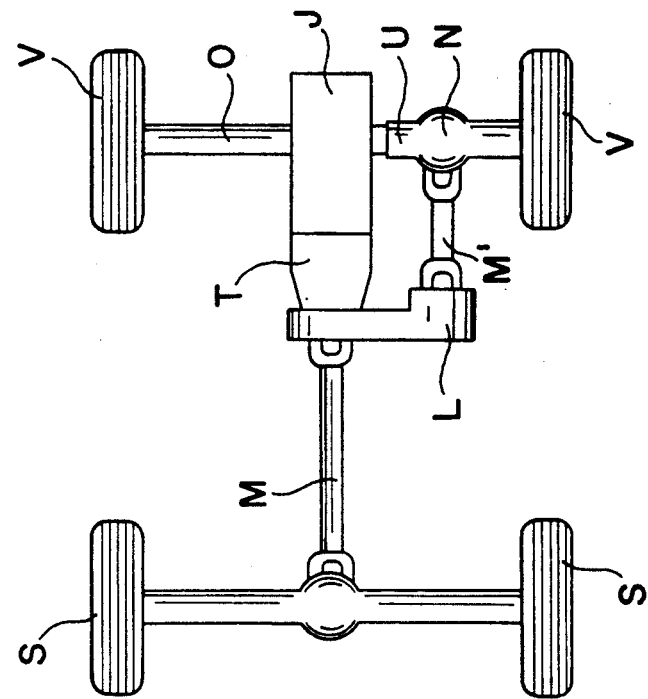
FIG. 2 is a schematic illustration of the power train of a four-wheel drive vehicle having a single axle disconnect for engaging and disengaging the power train at the axle disconnect location of a front axle.
Figure 1:
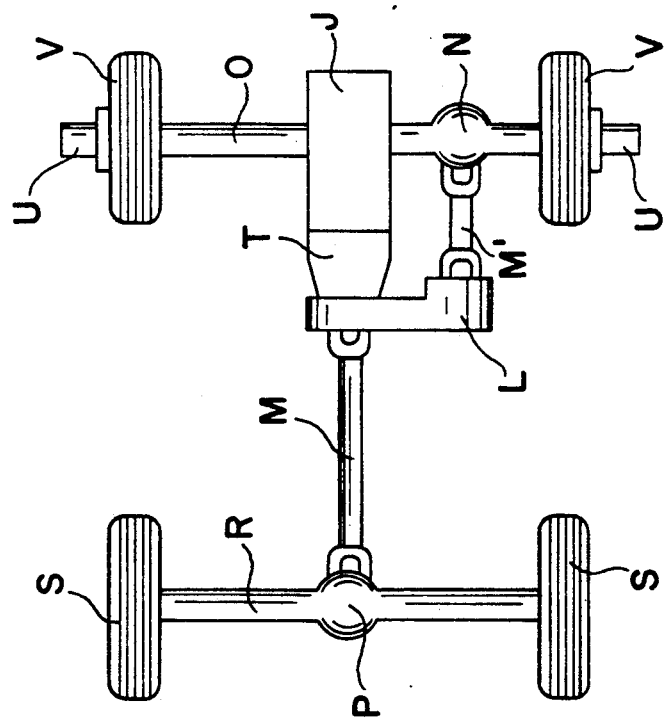
FIG. 1 is a schematic illustration of the power train of a vehicle employing a clutch mechanism at each front wheel for the purpose of engaging and disengaging the power train with respect to the front wheels.

Referring in more detail to the drawings, in FIG. 1 a preferred form of clutch assembly U is connected to each of the front ground-engaging wheels V of a motor vehicle; and in FIG. 2 the clutch assembly U is illustrated as an automatic axle disconnect associated with a front drive shaft of a vehicle, although it will become more readily apparent that the clutch assembly of the present invention has a number of other useful applications.

In FIG. 1, an engine J has a transmission T into a rear propeller shaft M and a transfer case L, the latter extending into front propeller shaft M' into front differential N and front axle housing 0. The propeller shaft M is coupled with a rear differential P in the rear axle R for the rear wheels S. Engine power is transmitted through the transmission T via transfer case L and front propeller shaft M' to the front differential N and a drive shaft A within the axle housing 0. When four-wheel drive is desired, the transfer case L is shifted to engage the front drive system to supply power through the front propeller shaft M' and differential N to the clutch assemblies U mounted at either end of the axle or shaft A; and when the clutch assemblies are engaged in a manner to be described will impart positive rotation to the front wheels V.

In FIG. 2, when the operator desires four-wheel drive, the transfer case L is shifted to engage the front drive system and apply power to the front propeller shaft M' and differential N to the front axle or shaft portions within the housing O so as to drive the front drive shaft A in a manner described in more detail with reference to FIG. 7.

Figure 3:
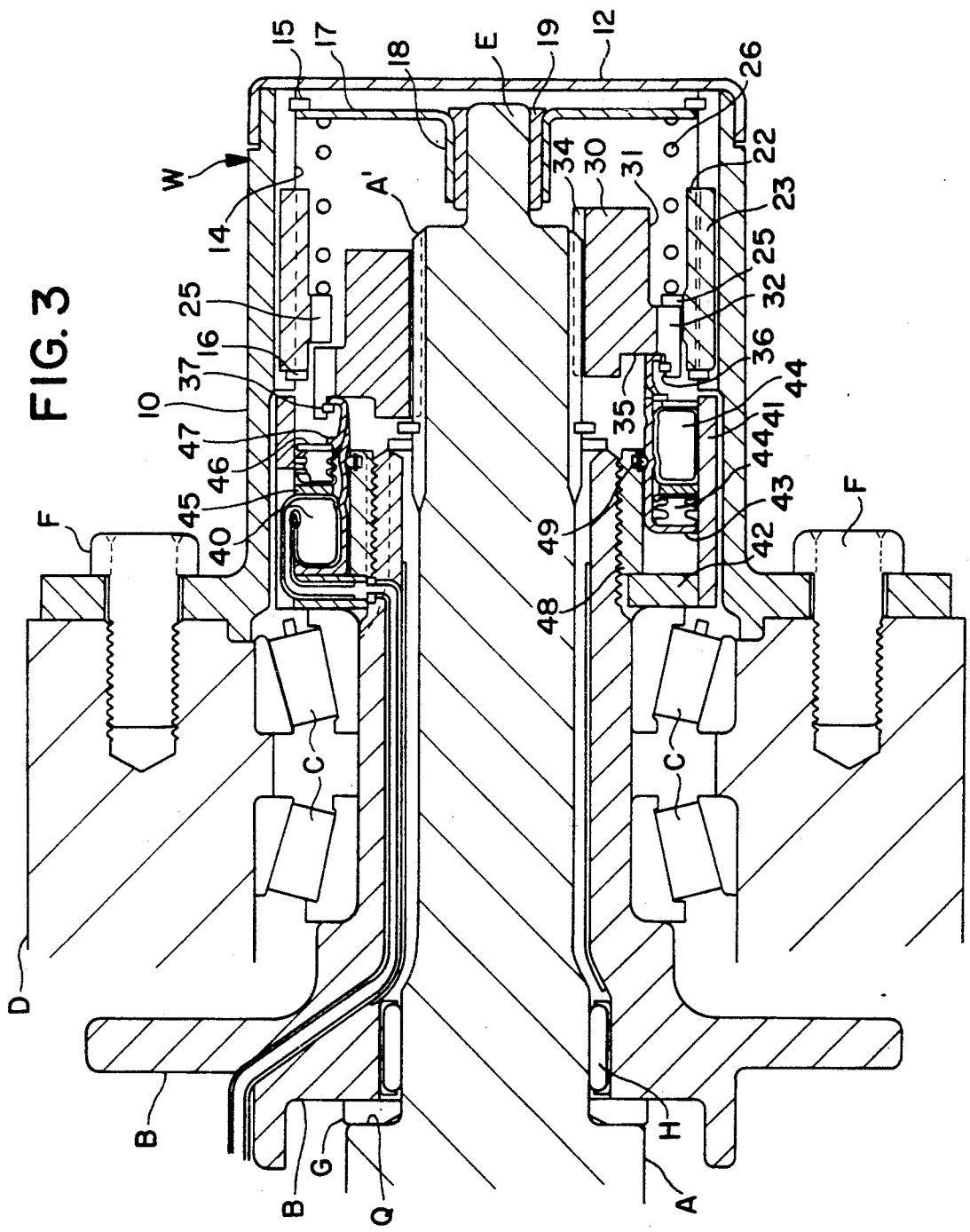
FIG. 3 is a sectional view of a preferred form of clutch mechanism in which the upper half of the section illustrates the mechanism in two-wheel drive mode and the lower section in four-wheel drive mode.

Referring to FIG. 3, the drive shaft A is housed within a non-rotating spindle B at each end of the axle housing 0, and opposite ends of the shaft A include circumferentially spaced, axially extending splines A' as well as smaller diameter, smooth surfaced extensions E which are inserted into and radially supported by the bearings 19.

Figure 6:
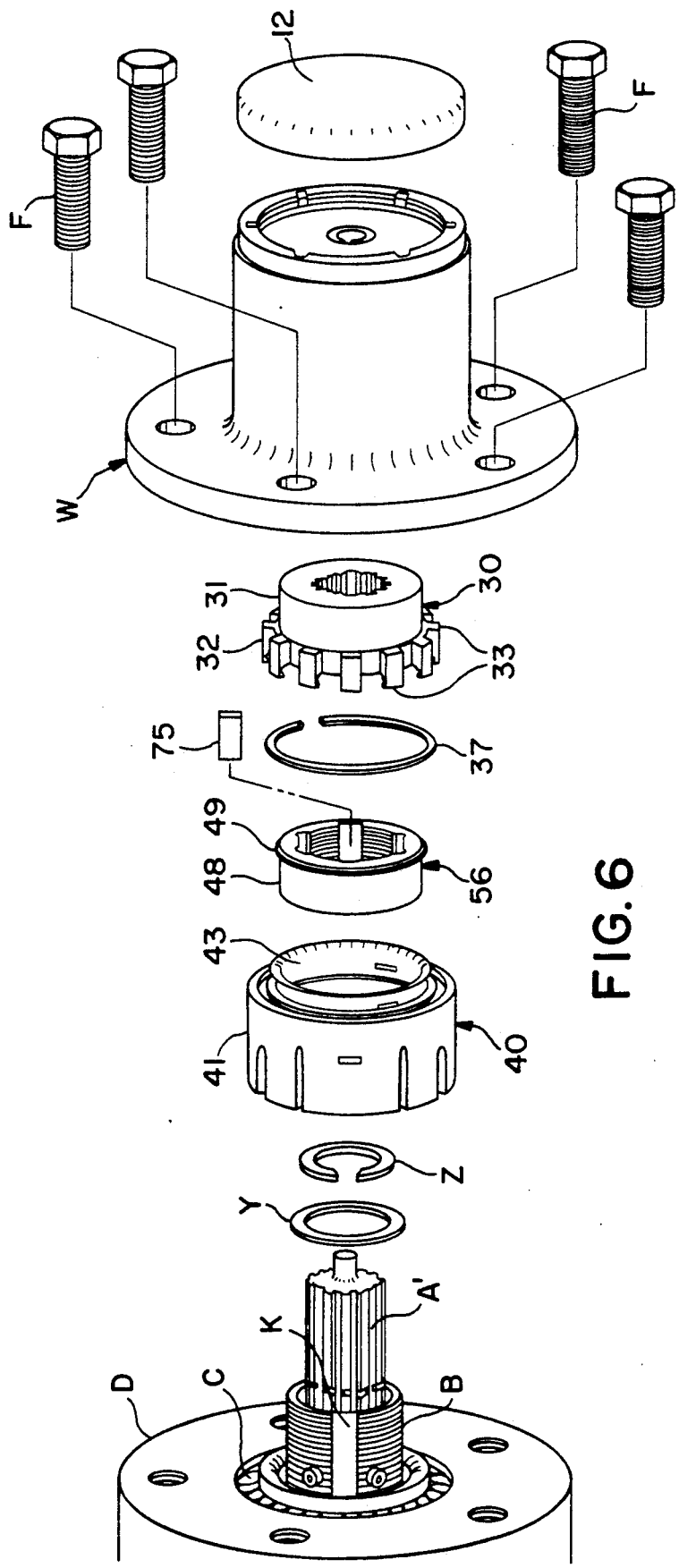
FIG. 6 is an exploded view of the preferred form of clutch mechanism with the parts and subassemblies aligned to show the sequence of application to the vehicle.

Referring to FIGS. 3 and 6, the spindle B is a fixed tubular member and which is externally threaded for a limited distance along each external surface at opposite ends, each threaded portion being interrupted by a keyway K extending parallel to the axis of the spindle B. Radial bearings C are disposed in surrounding relation to the spindle provided with a central sleeve-like hub 18 for insertion of the bearing 19 for the outport extremity of the shaft A. The retainer 17 is preferably in the form of a thin-walled disk which is sized to fit closely within the smaller diameter of the internal splines 14 of the cylindrical portion 10. The radial bearing 19 is in the form of a split sleeve having opposite flanged end portions 20 and 21 and of sufficient resiliency that it may be compressed for insertion into the hub 18 as shown and expanded outwardly into fixed engagement with the hub.

The receiver gear 22 is disposed within the receiver housing W and is of heavy-walled tubular configuration provided with external, axially extending ribs or splines 23 at equally spaced circumferential intervals to interengage with the internal splines 14 in the receiver housing for axial slidable movement between the outboard retaining element 17 and an inboard retaining ring 16. The receiving gear 22 is provided with radially inwardly projecting tooth elements 25 and which are arranged at equally spaced circumferential intervals around the inner surface of the gear 22 but of a limited length with respect to the total length of the gear. The receiver gear 22 is normally biased or urged in an inboard direction so as to bear against the inboard retainer ring 16 under the urging of a coiled return spring 26 which is interposed between inner tooth elements 25 and the retainer element 17.

As further seen from FIGS. 3 and 6, a drive gear 30 is of thick-walled tubular configuration having a smaller external diameter smooth surfaced portion 31 at one end and a larger diameter toothed external surface portion 32 at its inboard end, the individual tooth elements 33 aligned for intermeshing engagement with the internal tooth elements 25 on the receiving gear 22. Axially directed splines 34 on the internal surface of the drive gear 30 are complementary with the external splines A' on the drive shaft A. In this way, the drive gear 30 is keyed for rotation with the drive shaft A but is axially slidable or displaceable independently of the drive shaft toward and away from the receiver gear 22. The inboard face of the drive gear is recessed as at 35 to define a shoulder portion 36 on the inner surface of the toothed section 32, and a retaining ring 37 is pressfit within a groove on the inner shoulder of the toothed section to establish locking engagement with the shift assembly 40 in a manner to be hereinafter described.

In order to positively control the movement of the drive gear 30 into and away from engagement with the receiver gear 22, in accordance with the present invention, the power shift assembly 40 is mounted on a common axis with that of the drive gear 30 and driven gear 22. From a consideration of FIGS. 3 and 4, the power shift assembly 40 is broadly comprised of a housing tube 41, keyed washer 42, drive tube 43, first and second expandable chambers 44 and 44', a divider washer 45, confinement washer 46 and a retaining ring 47.

Figure 4:
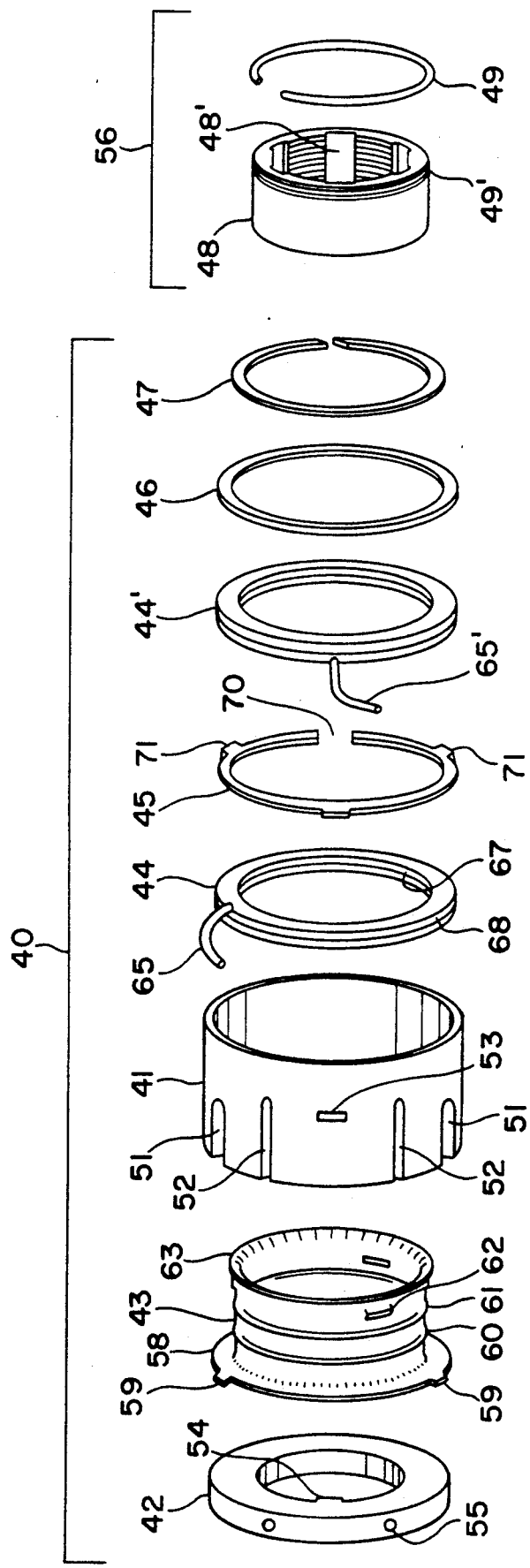
FIG. 4 is an exploded view of a preferred form of power shift assembly and the means for attaching the power shift assembly to the vehicle.
Figure 5:
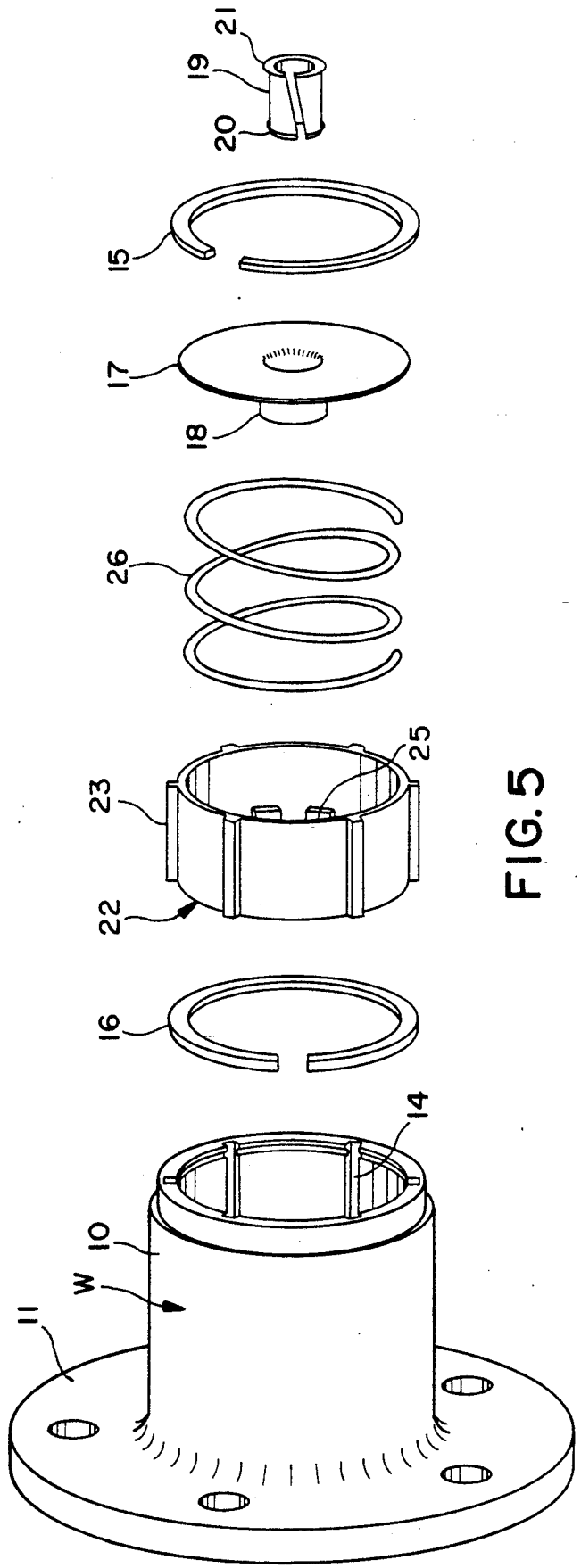
FIG. 5 is an exploded view of the receiver gear of the clutch mechanism.

Referring to FIG. 4, the housing 41 is of tubular configuration and provided with narrow, elongated slots extending axially from the inboard end of the tube including three shorter slots 51 and a pair of longer slots 52. The slots 51 are of corresponding width and length and disposed at equally spaced circumferential intervals, while the slots 52 are spaced between two of the shorter slots 51. For example, the slots 52 as shown are spaced on the order of 60° apart and each being spaced inwardly on the order of 30° from one of the respective shorter slots 51. Rectangular apertures 53 are located at equally spaced circumferential intervals equidistant from the inboard end of the tube 41 with one of the apertures 53 located intermediately between the longer slots 52 as illustrated in FIG. 4.

The keyed washer 42 is a thick-walled annular member whose outer diameter establishes a snug fit with the inside diameter of the housing 41 and whose inner diameter establishes a snug fit with the threaded external surface of spindle B. A radially inwardly directed tab 54 on the inner surface of the washer 42 interlocks with the keyway K of the spindle B. In turn, radial bores 55 extend through the washer 42 on either side of the tab 54 and correspond to the circumferential spacing and location of the slots 52 on the housing tube 41.

The drive tube 43 is of thin-walled tubular configuration with an outwardly flared end portion 58 at one end which fits closely within the inner diameter of the housing tube 41, there being three equally spaced tabs 59 on the outer periphery of the end portion 58 which are sized and spaced to fit slidably into the shorter slots 51 of the housing tube 41. A pair of annular, roll-formed ribs 60 and 61 on the external surface of the drive tube 43 are axially spaced to correspond with opposite end limits of the shift length of the assembly. In this relation, the ribs form internal, circularly extending grooves in the wall of the drive tube 43 for releasable engagement with the retaining ring 49. Radially outwardly directed tabs 62 are located intermediately between rib 61 and outwardly flared end portion 63 of the drive tube, the retaining ring 47 being inserted in snapfit relation between the tabs 62 and the confinement washer 46.

The inflatable chambers 44 and 44' are of generally doughnut-shaped configuration and are separated by the common divider washer 45, there being thick-walled flexible tubes 65, 65' communicating with the sealed interior of a respective chamber 44, 44' and each tube extending away from its respective chamber through one of the longer slots 52 of the member 41 for insertion into radial bores 55 of the key washer 42. Each of the chambers 44 and 44' is of a unitary molded construction having inner and outer spaced circumferential walls 67 and 68 which are directionally collapsible and expandable in an axial direction rather than a radial direction toward and away from the drive gear 30. The divider washer 45 is split or divided by a circumferential space or gap 70 and has external tabs 71 at spaced circumferential intervals for insertion into the apertures 53 on the tube member 41 so as to lock the washer 45 into position with respect to the member 41.

The confinement washer 46 has an outer diameter dimensioned for close-fitting insertion into the tube member 41, and the inner diameter of the washer 46 being great enough to clear the flared end portion 63 of the driver tube 43. The retaining ring 47 is circumferentially divided or split as shown so as to be radially expandable to a sufficient size to clear the end portion 63 as well as the tabs 62 and to snap into position behind the tabs 62.

FIG. 4 depicts the sequence of assembling the shift mechanism 40 wherein the drive tube 43 is inserted into the left end of housing 41 with the tabs 59 inserted into slots 51. The thick-walled keyed washer 42 is next to be inserted and is permanently affixed to and within the housing 41, with the radial bores 55 aligned with slots 52 so that the flat face of the keyed washer 42 is flush with the end of the housing 41. Continuing the assembly the balance of the parts 44, 45, 44', 46 and 47 are inserted into the opposite end of the housing 41 to that of the washer 42. When the inflatable chambers 44 and 44' are inserted with the divider 45 therebetween, the tubes 65 and 65' are inserted within slots 52 and, with a coating of gasketing adhesive, are inserted into respective bores 55 of keyed washer 42.

Further referring to FIGS. 4 and 6, the nut assembly 56 consists of a nut 48 and a snap ring 49. The internal diameter of nut 48 is threaded onto the spindle B and has a series of circumferentially spaced keyways 48' at equal intervals which extend linearly within the inside diameter, interrupting the threads, which keyways are sized to match the keyway width of keyway K at spindle B. An annular groove 49' is cut into the outside diameter of nut 48, adjacent to the outboard end of the nut. Groove 49' is dimensioned to a width and depth to enable snap ring 49 to be fully compressed to a diameter less than the outside diameter of the nut. Snap ring 49 is formed of a round spring wire and sized to an outside diameter which exceeds the inside diameters of annular detent ribs 60 and 61 of the drive tube 43.

Referring to the overall disposition and assembly of the shift mechanism 40 relative to the spindle B, as shown in FIGS. 3, 4 and 6, after shaft restraint washer Y is placed against the outer face of spindle B and locked in position by retaining ring Z, the shift assembly 40 is next installed with the tab 54 of washer 42 interengaging the keyway K as the assembly 40 is slidably pushed onto spindle B. In this relation, the inner surface of washer 42 snugly engages the spindle B and the face of the washer 42 abuts the cone race member of bearing C.

With continued reference to FIG. 6 which shows the sequence of application of parts and subassemblies to the vehicle wheel end, the nut assembly 56 is screwed onto the spindle B within shift assembly 40 and against the inside face of washer 42. As commonly practiced in vehicle assembly, the nut 56 is tightened then slightly released to establish minimal wheel bearing end play. One keyway 48' is aligned with keyway K of spindle B thereby allowing for the insertion of key which locks the nut 48 against rotation on the spindle and further locks the shift assembly 40 into a non-rotating linear position.

As viewed from the upper section of FIG. 3, when the outboard chamber 44' is contracted and the inboard chamber 44 is expanded, it will cause inboard movement of the drive tube 43 and the flared end 63 of the tube 43 will engage the ring 37 to retract the drive gear 30 in a direction away from the receiver gear 22. Conversely, as viewed in the lower section half of FIG. 3, when the lefthand or inboard chamber 44 is contracted and the righthand or outboard chamber 44' is expanded it will axially displace the drive tube 43 away from the washer 42 causing the leading end 63 of the drive tube to bear against the end face of the drive gear 30 and to axially displace it in an outboard direction into intermeshing engagement with the tooth elements 25 of the receiver gear 22.

Figure 8:
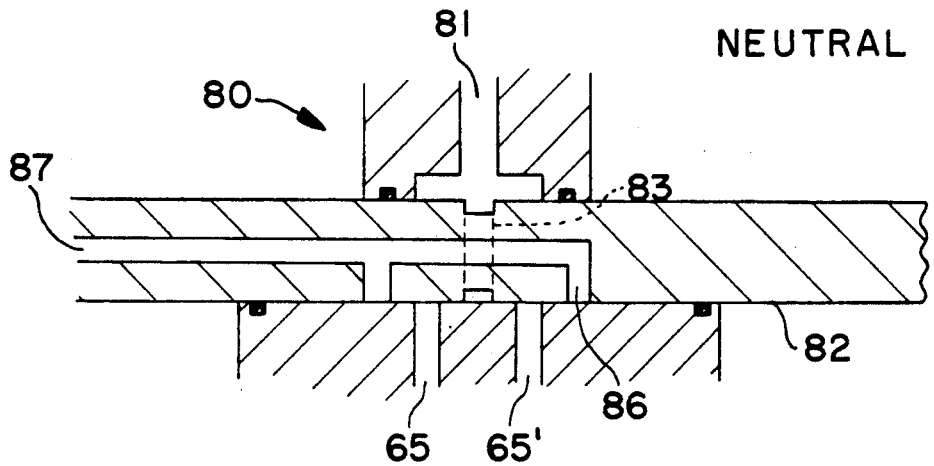
FIGS. 8, 9 and 10 are schematic illustrations of a preferred form of control valve for effecting engagement and disengagement of the clutch mechanism under the complete control of the operator at all times.
Figure 9:
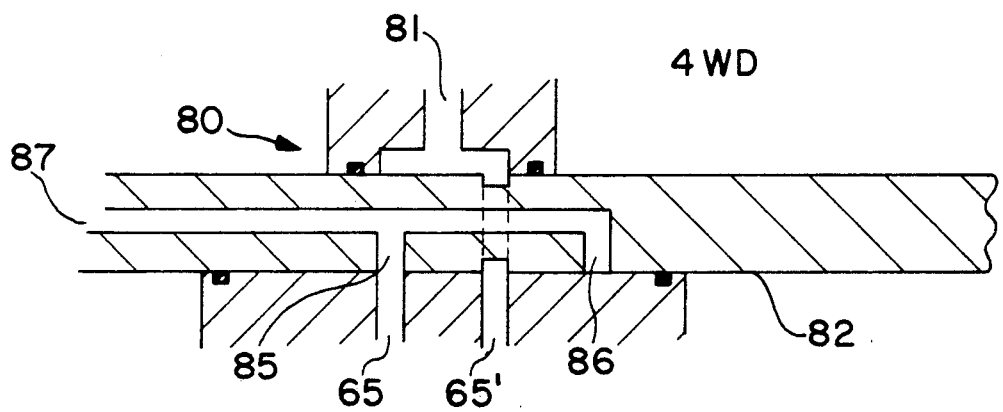
Figure 10:
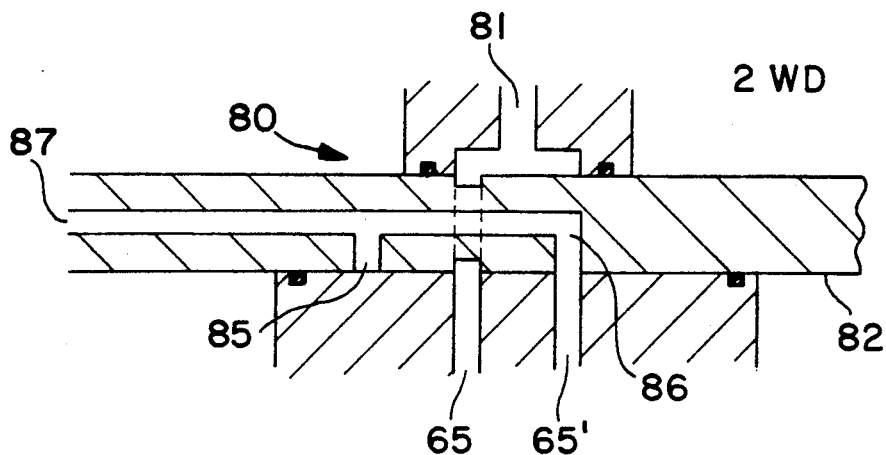

A preferred method and apparatus for activating the power shift assembly 40 is schematically illustrated in FIGS. 8, 9 and 10 wherein a flow control, dual selection valve 80 can be operated to control movement of the drive gear 30 into and out of engagement with the receiver gear 22. To this end, the valve 80 includes a source of fluid under pressure which communicates with a common port 81, and a sliding core element 82 includes an annular flow groove 83 which communicates with the port 81. Fluid return ports 85 and 86 communicate with a fluid reservoir via the common return line 87, and the control lines or tubes 65 and 65' into the chambers 44 and 44', respectively, are connected into the valve 80 as shown. In FIG. 8, the sliding core valve 80 is shown in the neutral position. The valve will move to an alternate position for the time required to shift the drive gear from one mode to another, such as, from an engaged to disengaged position with respect to the driven or receiver gear 22. After a shift has been completed the valve is then returned to its normal or neutral state as illustrated in FIG. 8.

Referring again to FIG. 3, the upper section illustrates the shift assembly with the drive gear in disengaged or the two-wheel drive mode. In order to shift to the four-wheel drive mode, the valve 80 is advanced to the position shown in FIG. 9 whereby fluid under pressure is directed through the port 81 and flow groove 83 to the flow tube 65' for the chamber 44'; and simultaneously the chamber 44 is opened through its flow tube 65 for return flow from that chamber through port 85 into the reservoir via line 87. Expansion of the chamber 44' will advance the drive tube 43 in an outboard direction thereby thrusting the drive gear 30 into engagement with the receiver gear 22. Should there be a substantial difference in revolutions per minute between the drive gear 30 and receiver gear 22, the receiver gear 22 is able to move in an outboard direction against the return spring 26 until the revolutions are nearly synchronized at which time the gear 30 will be aligned to advance into intermeshing engagement with the receiver gear 22. Recognizing that the shift assembly is not triggered by torque or engine power but functions independently of other power train components, this engagement can be caused prior to the application of torque to the drive or power train and with the high forces available from the pressure chamber to overcome the rebound force of the spring 26. Thus, the axial forces necessary to assure engagement between the gears 30 and 22 are considerably higher than the frictional resistance resulting from any drive line motoring torque. Prefunction engagement prior to applying engine or vehicle torque enables the transfer case gears to become synchronized before attempting engagement and accordingly enables relatively smooth, synchronous low force engagement of the transfer case.

Upon shifting to four-wheel drive, FIG. 9, the core valve 80 will return to its neutral position and no longer pressurize the chamber 44'. The valve 80 may incorporate any conventional form of bleed or bypass to permit a gradual reduction of the pressure and gradual relaxation of pressure within the chamber.

Shifting from the four-wheel drive mode to the two-wheel drive mode is illustrated in the upper section of FIG. 3 and in FIG. 10 when the valve 80 is shifted to a position in which the fluid under pressure is directed from the port 81 via the flow groove 83 to the tube 65 leading to the inboard chamber 44 and the chamber 44' is exhausted through its tube 65' to the reservoir. When this occurs, the drive tube 43 will retract the drive gear 30 away from engagement with the receiver gear 22 with the drive tube 43 axially displaced such that the ring 49 moves out of engagement with the inboard rib 60 and into engagement with the outboard rib 61.

For the purpose of illustration, as shown in FIGS. 3 and 6, the spindle B is provided with suitable passageways for extension of the pressure tubes 65 and 65' between the expansion chambers 44 and 44' and the flow control valve 80, the valve 80 being suitably positioned so as to be either directly or remotely controllable by the vehicle operator. The high pressure source of fluid may be derived from a power steering pump or other source of pressure in the vehicle; and a compressed gas, air or hydraulic fluid may be utilized. A most important consideration is that the power shift mechanism 40 is essentially confined within and integral to the wheel hublock envelope and can be remotely but positively controlled by the operator to advance and retract the drive gear 30 into and out of engagement with the receiver gear 22.

Description of Modified Form of the Present Invention

Figure 7:
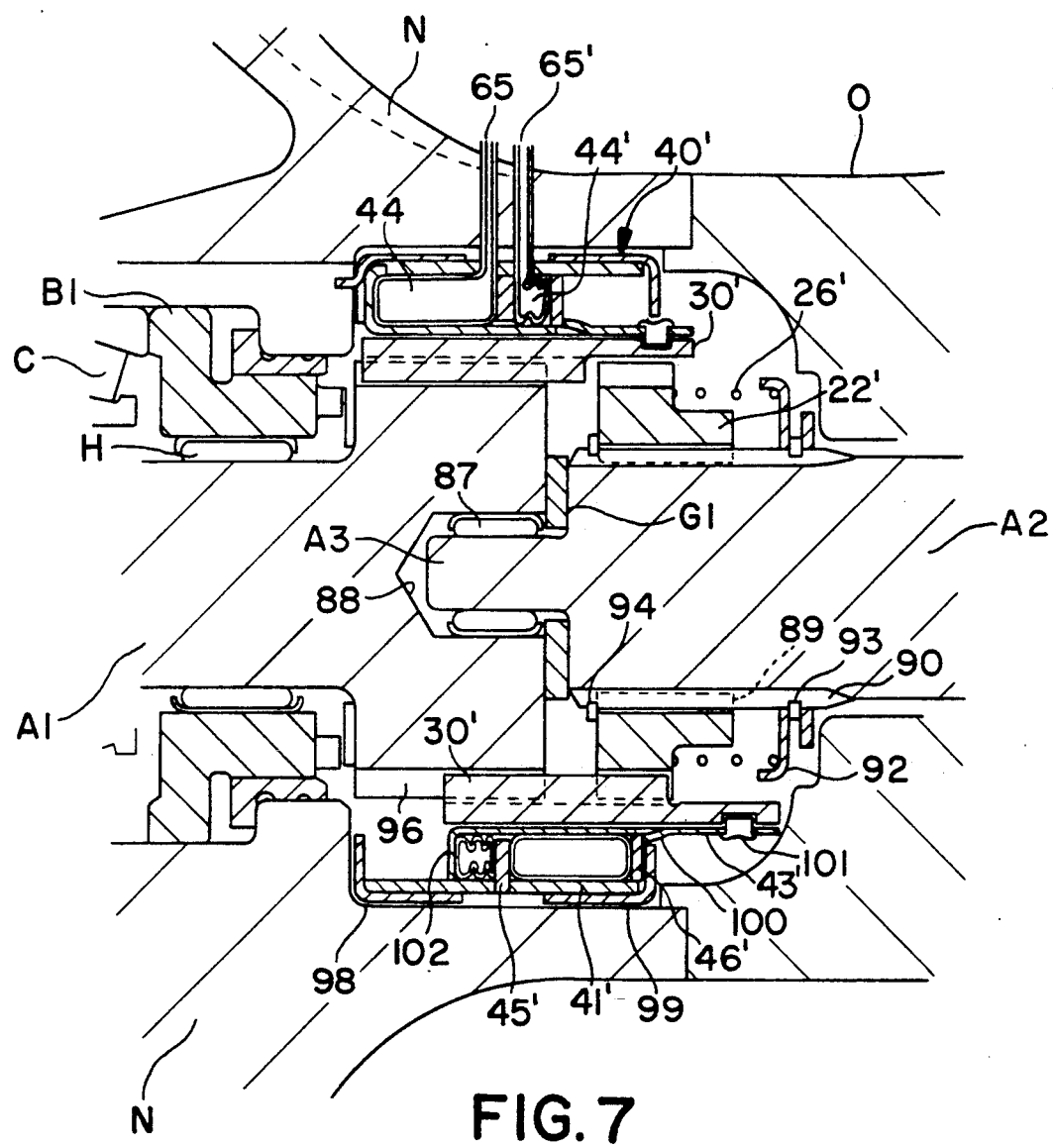
FIG. 7 is a sectional view of a modified form of clutch mechanism located within the axle and applied as an axle disconnect.

There is illustrated in FIG. 7 a modified form of clutch assembly U incorporated into an axle disconnect and specifically for the purpose of selectively engaging and disengaging one end of the drive shaft A with respect to the wheel hub D. As illustrated in FIGS. 2 and 7, the clutch assembly U' is incorporated as a unitary part of an axle disconnect in which axle portions A1 and A2 are selectively engaged and disengaged by the clutch assembly U' which is housed at the interface between differential N and the axle housing O. The drive shaft portions A1 and A2 are coaxially arranged in end-to-end relation to one another with a reduced end A3 journaled by a bearing 87 within a counterbored portion 88 at the end of the portion A1. In addition, the portion A1 is journaled with respect to non-rotating spindle B1, by bearing H. In this relation, like parts to those of the preferred form of FIGS. 1 to 6 and 8 to 10 are correspondingly enumerated, although it will be appreciated that their relative locations differ. Thus, a receiver gear 22' has internal splines 89 which interengage with external splines on the shaft portion A2 and is axially displaceable between an annular cup-shaped ring 92, seated against retaining ring 93 at one end of the splines 90, and a retainer ring 94 at the opposite end of the splines 90. A return spring 26' is disposed for extension between the cup-shaped limit stop 92 and an end surface of the receiver gear 22' to bias the gear 22' in a direction toward the shaft portion A1.

The drive gear 30' is disposed in outer concentric relation to the receiver gear 22' and is provided with internal splined portions which engage external splines 96 on the shaft portion A1 and are slidably displaceable with respect to the splines 96 in an axial direction toward and away from the receiving gear 22' by the power shift mechanism 40'. An annular shim G1 is interposed between the confronting ends of the shaft portions A1 and A2. The modified form of power shift assembly 40' includes outer housing tube 41', inner drive tube 43', first and second chambers 44 and 44' separated by a divider washer 45' which extends radially between the outer housing tube 41' and inner drive tube 43'.

The outer housing tube 41' is mounted within axially spaced retainer cups 98 and 99, and a confinement washer 46' is disposed at one end of the chamber 44' and retained in position by a sprung extension tab 100 which projects radially and outwardly from the surface of the drive tube 43'. The drive tube is extended in outer concentric surrounding relation to the drive gear 30' and is affixed at one end, such as, by means of a rivet 101 to the gear 30', and the opposite end of the drive tube 43' is bent outwardly as at 102 to confine the end of the chamber 44. The chambers 44 and 44' function in the same manner as described with respect to the preferred form: Briefly, when the chamber 44' is contracted and the chamber 44 expanded it will cause movement of the drive gear 30' in a direction away from the receiver gear 22' into the relationship illustrated at the upper section of FIG. 7. As seen from the lower section of FIG. 7, when the chamber 44 is contracted and the chamber 44' is expanded, the drive tube 43 is displaced causing engagement of gear 30' with the receiver gear 22'. The manner and means for operating the power shift mechanism is the same as described with reference to the preferred form by remote activation through a selection valve as illustrated in FIGS. 8 to 10. Accordingly, when the mechanism has shifted the axle disconnect clutch assembly either to the engaged or disengaged position with respect to the receiver gear, the valve 80 will return to its neutral position in preparation for the next shifting operation. In both forms, the divider washer 45' is fixed in place to establish a stationary support for movement of the chambers 44 and 44' away from the common divider and so that the thrust of the chamber is confined to an axial direction; and in the course of expanding and contracting through each sequence it will be apparent that the total cubic inch displacement of the combined chambers does not vary. Again, recognizing that the clutch assembly is not triggered by torque or engine power and functions independently of other power train components, engagement can be effected before the application of torque to the drive train and with high forces available from high fluid pressure sources can readily overcome the biasing force of the spring 26 or 26' and any frictional resistance that may be present. Prefunction engagement in this manner enables the transfer case gears to become synchronized before attempting engagement and enables relatively smooth, synchronous low force engagement of the transfer case.

For the reason that the overall combined displacement of the chambers 44 and 44' does not vary in shifting the drive gear between engaged and disengaged positions, it therefore does not require venting to the atmosphere with the related problems of inhaling moisture or contaminants; nor does the invention require special filters or seals or impose undue pressure on existing seals of the system.

It should be noted that when the clutch mechanism of the present invention is applied to an axle disconnect, as shown in FIG. 7, it is not subject to substantial thrusting caused by steering or turning as occurs when the clutch mechanism is mounted or incorporated into the wheel hubs at opposite ends of a drive shaft, as shown in FIGS. 1 to 6. Thus, in the form of invention shown in FIGS. 1 to 6, when the front wheels of a vehicle are turned, the center line of the U-joint interconnecting the drive shafts A will tend to move in at least two different planes as well as reactivate third plane of movement caused by suspension flex or jounce. Thus, the shaft A must be permitted to move axially or linearly to a degree sufficient to not overstress; yet at the same time must be limited in such movement to avoid locking under applied torque or preventing or resisting steering in the opposite direction. Thus, the shafts A and clutch assembly are permitted to undergo a limited amount of reciprocal thrusting movement by virtue of the size and spacing of the ribs 60, 61 in cooperation with the ring 49. Moreover, the pressure chambers 44 and 44' in FIGS. 1 to 6 serve to shift the mechanism under high pressure to override any friction of the gears interfacing under torque. However, once shifted, there is no need for continued application of force but only to maintain the relative position of the gears while in the four-wheel drive mode and the pressure need not be maintained. In two-wheel drive, the detent 49 serves only to maintain the gears from accidentally sliding outwardly under certain impact, turning or steering. Typically, in an axial disconnect the shaft portions A1 and A2 are fixed axially with respect to one another by snap rings, not shown, and to some extent by the shim or thrust washer G1. As a result, the detenting is not required for the clutch mechanism in an axle disconnect as it is for the wheel hub application.

Detailed Description of Locking Mechanism for Power Shift Assembly

Figure 11:
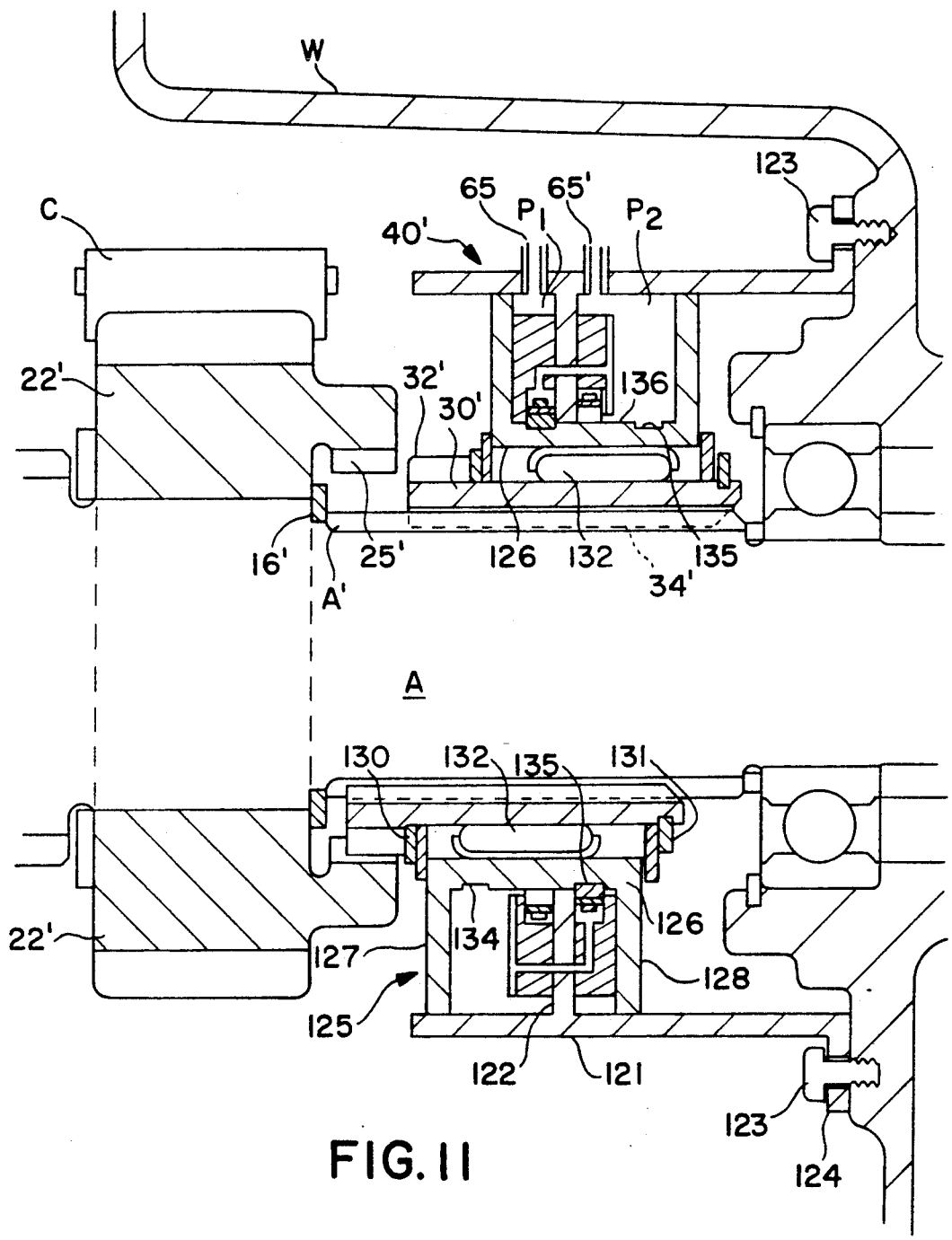
FIG. 11 is a longitudinal sectional view of a modified form of power shift assembly for a transfer case including a positive locking mechanism, the upper half of the section shown in the disengaged position and the lower half shown in the engaged position.

Referring to FIG. 11, a power shift assembly 40' is of a type broadly corresponding to that illustrated in FIGS. 3, 4 and 7. Once again, the power shift assembly 40' is utilized in association with a clutch assembly surrounding a shaft A within a housing W to regulate the axial displacement of a drive gear 30' into and out of engagement with a receiver gear or sprocket 22' for a chain C or other member to be driven. The receiver gear 22' is provided with inwardly projecting tooth elements 25' and is on the shaft A. The drive gear 30' has inwardly directed axially extending splines 34' which are complementary to the external splines A' on the drive shaft A so that the drive gear is keyed for rotation with the drive shaft A but axially displaceable to advance the external, axially directed tooth elements 32' into and out of engagement with the mating toothed elements 25' on the receiver gear 22'. The power shift assembly 40' is located in outer concentric relation to the gear 30' in a manner to be described and is comprised of an outer tubular housing 121 having a radially inwardly directed divider wall 122 of annular configuration, the outer wall being affixed at one end to the housing wall by circumferentially spaced bolts 123 extending through flange 124 at the end of the wall. A generally spool-shaped shifter housing 125 includes a tubular inner wall 126 and radially extending end walls 127 and 128 at opposite ends of the tubular member 126 with outer free ends of the end walls 127 and 128 in sealed abutting relation to the inner surface of the tubular housing 121. The shifter housing 125 as described is axially fixed with respect to the drive gear 30' by retaining rings 130 and 131 on the drive gear, and suitable bearing members 132 are interposed between the inner wall surface of the shifter 125 and the drive gear 30' so that the drive gear is freely rotatable with respect to the shifter 125 but will follow any axial displacement of the shifter. The external wall surface of the inner tubular portion 126 of the shifter 125 is provided with circumferential grooves 134 and 135, and the divider wall 122 has an inner circumferentially extending edge 136 which is disposed in sealed relation to the outer surface of the tubular portion 126 between the grooves 134 and 135 so that pressure chambers $P_1$ and $P_2$ are formed within the shifter on opposite sides of the divider wall 122. Fluid supply ports 65 and 65' communicate with the respective pressure chambers $P_1$ $P_2$ on opposite sides of the divider wall.

As best seen by reference to FIGS. 12 to 14, annular locking members 140 and 140' are affixed to opposite sides of the common divider wall 122. Each locking member is correspondingly made to be of generally rectangular cross section with a longer sidewall permanently affixed to the divider wall and with a radially inwardly disposed recess 141 to accommodate a limit stop 142. In order to establish communication between each recessed portion 141 and the opposite pressure chamber $P_1$ or $P_2$, fluid passageways 144 and 144' extend first radially then axially away from respective recessed portions 141 of the locking members to communicate with open-channeled portions 143 which are indented at circumferentially spaced intervals around the sidewalls of the lock members opposite to the divider wall sides.

Each of the limit stops 142 is illustrated in detail in FIG. 16 and comprises a circumferentially extending band 146 having overlapping end portions 147 and 148, the bands being of a spring steel construction and having a width corresponding to the width of the recess 141. Generally cylindrical blocks 150 are disposed at circumferentially spaced intervals around each band 146 and each is affixed to the band by a rivet pin 151 extending outwardly through an opening in the band and riveted in place so that the blocks 150 project in radially inward directions away from the band. The blocks are sized to correspond to the width of the band spring and to the recessed chambers 141 so as to be radially movable within each chamber. Further, the diameter of each block is slightly undersized with respect to the width of the respective grooves 134 and 135. Further in this relation, it will be noted that a slight clearance 152 is left between the inner edge of each locking member 140 and outer surface of tubular wall 126 to permit the passage of fluid into the grooves 134 and 135.

In operation and by reference to FIGS. 12 to 14, FIG. 12 shows the relationship between elements when the shifter 125 is advanced to a righthand position in which the drive gear 30' is disengaged from the receiver gear 22' as a result of introducing fluid under pressure through fluid port 65' and returning fluid under pressure from port 65 through the reservoir. When fluid is introduced under pressure in this manner, it will force the end walls 127 and 128 to the right until the limit stops 142 and specifically the blocks 150 move into alignment with the lefthand groove 134 whereupon the fluid under pressure through the passageway 144 will cause the blocks 150 to be urged into a seated position within the groove 134. The inward biasing of the limit stops and particularly the band 146 will retain the blocks 150 within the groove notwithstanding reduction or removal of fluid pressure in the chamber $P_2$ and thus will remain in the position shown in FIG. 12.

When fluid pressure is reversed so that fluid under pressure is applied through port 65, it will pass through the channel portions 144', 143 and clearance space 152 and beneath the limit stop 142 to lift it away from its associated groove 134. Continued application of pressure will then cause the shifter to advance in an inboard direction, or to the left as shown in FIG. 14, until the outboard limit stop 142' moves into pressured registry with groove 135. The effect will be to advance the drive gear 30' into engagement with the receiver gear 22' and to lock in the engaged position irrespective of any reduction in pressure in the chamber $P_1$. In a manner corresponding to that described with reference to FIG. 12, in order to release or unlock the shifter mechanism, it is necessary to reverse the pressure and apply a high pressure via chamber $P_2$ to the inner surface of the band 146 and blocks 150 with a reduction in pressure from the chamber $P_1$ on the outer surface of the band 146 until it returns to a retracted position away from the groove. The shifter 125 is then free to return to the extreme outboard position as shown in FIG. 12.

Figure 18:
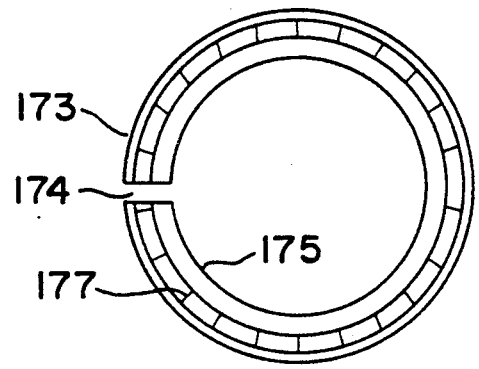
FIG. 18 is an end view of one of the locking members of the shift assembly of FIG. 17.

FIG. 17 illustrates an alternate form of power shift assembly 160 for axially shifting a drive gear 30" into and out of engagement with a receiver gear or sprocket 22" in a manner corresponding to that described with respect to FIG. 11. Again, the power shift assembly 160 as well as the drive gear 30" are located concentrically with respect to shaft A". The assembly 160 includes a spool-shaped shifter mechanism 162 and a generally T-shaped member made up of an outer wall 164 and divider 165, and the T-shaped member is fixed by one or more tabs T into slots in the inner wall of stationary housing W'. A radially inwardly located wall 166 has spaced parallel sidewalls 167 extending from opposite edges in a radial outward direction into sealed engagement with the outer wall 164 as designated at 168. The generally U-shaped section made up of the inner wall 166 and sidewalls 167 defines in combination with the T-shaped member made up of outer wall 164 and divider wall 165 outboard and inboard chambers $P_4$ and $P_3$, respectively. Both the inner and outer walls 166 and 164 are of generally tubular configuration, and an inner radial extension 170 from the inner wall 166 terminates in a locking member 172 which interacts with a complementary locking member 173 to lock and unlock gear member 30" to and from receiver member 22'. Specifically, the locking member 173 takes the form of a snap ring which, as shown in detail in FIG. 18, is radially split as at 174 from the outside diameter to the inside diameter to enable expansion and contraction of the ring. A radially inward portion 175 of the ring is flat and when mounted within a circumferential groove 176 in the external surface of the shaft A", will extend in a direction normal to the longitudinal axis of the shaft; and the inner portion 175 curves outwardly into a generally dish-shaped, inclined portion 177 which is sloped in an outboard direction at an angle of approximately 60° from the plane of the inner portion 175. The cup-shaped enclosure 172 includes a straight radial wall portion 180 and an axially spaced sidewall portion 181 which terminates in an angled portion 182 at a complementary angle to the portion 177.

Figure 20:
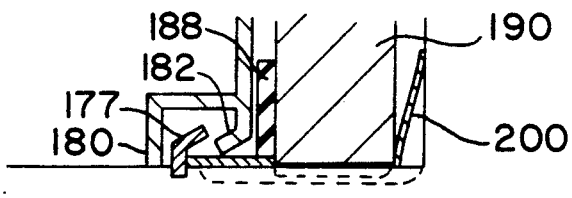
Figure 21:
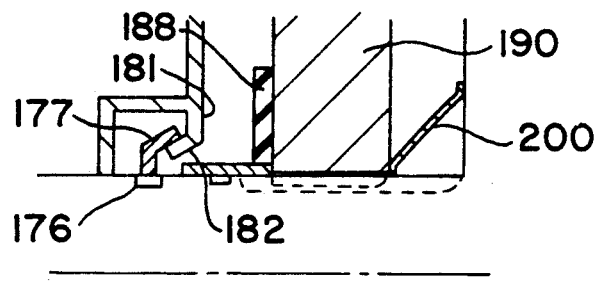

The inner diameter of the enclosure 172 is such as to permit radial expansion of the ring 173 under the forward or axially inboard thrusting of the terminal end 182 as shown in FIGS. 20 and 21. A spacer tube 184 and a washer-like thrust bearing 188 are interposed between a radial face of the drive gear 30" and the ring 173 and sidewall 181, respectively, in outer concentric relation to the shaft A". The spacer 184 establishes the proper spacing between the locking ring 173 and the rotating drive gear 30" in the upper engaged position shown in FIG. 17.

As a setting for this form of invention, drive gear 30" is mounted between the extension leg 170 as shown and receiver sprocket 22" which interengages with a chain member C in accordance with conventional practice, and the gear 30" is journaled with respect to the inner wall 166 by a bearing member 189. A generally cup-shaped carrier 190 consists of an outer cylindrical wall 193, its integral flat cup base 192 and an inner cylindrical portion 194, the latter having circumferentially spaced legs 194' extending in an outboard direction to slidably advance into mating holes 195 projecting into the sprocket 22".

Referring to FIG. 17, at the small outside diameter of gear 30" are a series of circumferentially spaced linear slots 161. Likewise at the inside diameter of the cylindrical wall 193 are a series of circumferentially spaced linear slots 193a. Disc-shaped friction discs or plates 196 and 198 have a series of circumferentially spaced tabs, respectively 196b and 198b, which extend radially and inwardly to engage slots 161 of gear 30", and a friction plate 197 has circumferentially spaced tabs 197b at its outside diameter which engage slots 193a of the carrier 190. A washer is inserted into an external groove in the gear 30" at the end of the slots 161 and against the larger diameter of gear 30" to form a radially extended shoulder and stop for locating the inboard friction disc 196. A spring 200 is interposed between the inboard, left face of sprocket 22" and the outboard face of the axially slidable carrier 190 to bias the carrier 190 in an inboard direction.

The lower half of FIG. 17 shows the shifter 162 shifted inboard sufficiently to enable the spring 200 to extend to its full length and remove the force against the carrier 190 and associated friction discs 196, 197 and 198 which are then free to rotate independently of one another. Thus for lack of a biasing force to compress the interfacing discs 196 to 198, the rotation of shaft A" and corresponding gear 30" will not transfer a rotational torque from gear 30" to sprocket 22".

The upper half of FIG. 17 illustrates the position of gear 30" when it has been driven outboard by shifter 162 thereby enabling snap ring 173 to insert itself into groove 176. Simultaneously, the rightward shifting of the extension 170 against thrust washer 188 and gear 30", through the compressive interfacing of discs 196, 197 and 198, will compress the spring 200. After the fluid pressure has been withdrawn from chamber $P_4$, the shifter 162 is free to relax slightly inboard but the snap ring 173 through spacer tube 184 will continue to maintain the outboard driven location of gear 30", as illustrated in the upper half of FIG. 17. Thus, in accordance with conventional practice, when the friction discs 196 to 198 are compressed into frictional engagement under the biasing force of spring 200, torque is transferred from the gear 30" through the discs to the carrier 190 and the sprocket 22".

Figure 19:
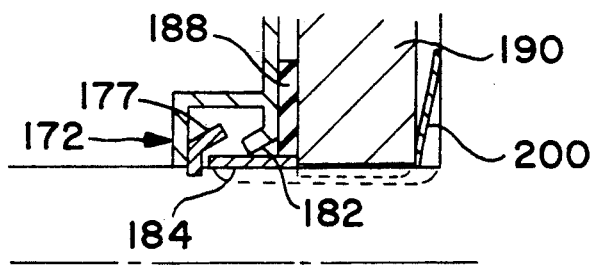
FIGS. 19 through 21 are enlarged fragmentary views illustrating successive movements of the locking members between the locked and unlocked position.

Shifting is controlled in the same manner as described in relation to FIGS. 11 to 16 wherein fluid under pressure is directed through one or the other of the inlet ports 202, 202'. Accordingly, when fluid under pressure is directed via port 202', the sidewall 167 is shifted away from the divider wall 165 to force the drive gear 30" in an outboard direction against the urging of the spring 200. Referring to FIGS. 19 through 21, which show a schematic relocation of spring 200, and further reference to FIG. 17, when fluid pressure is reversed and directed through the port 202, the shifter mechanism is caused to move in an inboard direction, or to the left, so that the inclined extension leg 182 is caused to advance sequentially from a position just touching the outer edge of the ring 173 to a position making full contact along the underside of the ring 173 thereby expanding the ring 173 outwardly from the groove 176. The drive gear 30" will follow the movement of the shifter mechanism to the left under the urging of the spring member 200 so that the friction plates 196-198 are free to spread slightly with the plates 196 and 198 then free to rotate independently of the intermediate plate 197.

Reverse shifting of the mechanism by introducing fluid pressure through port 202' will drive the plates 196 and 198 back into frictional engagement with the plate 197 thereby imparting torque once again to the sprocket 22".

Although the foregoing applications in FIGS. 11 to 16 and 17 to 21 have been described in relation to positive locking and release between a drive gear and receiver gear in a transfer case, it will be apparent that the clutch mechanism may be readily conformable for other applications in which torque is to be selectively transmitted from a drive gear to receiver gear and the assembly positively locked either in the engaged or disengaged positions.

From the foregoing, among other features of the shifter assembly and locking mechanisms of FIGS. 11 to 21 is the ability to utilize a generally spool-shaped shifter having juxtaposed pressure chambers responsive to fluid pressure, either hydraulic or pneumatic, to move or shift in an axial direction in response to pressurization. In so doing, the sifter mechanism is capable of advancing a drive member into and out of engagement with a member to be driven, such as, for instance, to drivingly engage clutch members as exemplified by the gears and friction plates as described. The shifter mechanism is capable of positively unlocking and relocking in a unified action with the application of pressure and wherein the fluid pressure is selectively directed to unlock and/or relock with the locking members integrated within the shift mechanism or externally thereof. Preferably, the shift mechanism is fixed against rotation but is capable of shifting other members that do rotate and can be concentrically located with respect to an axial or linear driven member as well as a non-linear driven member which is concentrically located with respect to the shift mechanism. Furthermore, through the application of fluid pressure to an annular shift mechanism, it is possible to apply uniform linear force circumferentially to the face of a drive member thereby causing it to be advanced into engagement with a member to be driven. In turn, the locking mechanism associated with the shift assembly achieves mechanical locking or unlocking between a drive and driven member so that the fluid pressure can be removed after completion of the shift sequence.

The spool-shifter assembly is further characterized in that two or more pressure chambers can be utilized according to space limitations or requirements to increase the resultant linear or axial force applied without increasing the fluid pressure, and the effective area across which force is applied may be varied over a wide range without substantial variations in the inner and outer diameters of the pressure chambers.

It is accordingly to be understood that while preferred and modified forms of the present invention are herein set forth and described that various other modifications and changes may be made without departing from the spirit and scope of the present invention as defined by the appended claims.

I claim:

1. In a shift mechanism for controlling engagement and disengagement between a first rotatable drive member and a second member to be driven, the improvement comprising:

shift means including a plurality of annular non-rotatable pressure chambers arranged in juxtaposed relation to one another including chamber walls shiftable in response to changes in differential pressure between said pressure chambers; and shift-actuating means including means for applying pressure to each of said pressure chambers whereby to regulate the differential pressure between said chambers to reversibly shift said chamber walls toward and away from said member to be driven, said drive member following the displacement of said chamber walls into and out of engagement with said member to be driven.

2. In a shift mechanism according to claim 1, including first releasable locking means associated with said shift means for locking said drive member in engaged relation to said member to be driven and second releasable locking means associated with said shift means for locking said drive member in disengaged relation to said member to be driven.

3. In a shift mechanism according to claim 2, including release means for releasing either of said first or second locking means from their locked positions in response to changes in differential pressure between said pressure chambers.

4. In a shift mechanism according to claim 1, said shaft means having a stationary, radially extending divider wall between juxtaposed of said pressure chambers, said shiftable chamber walls displaceable in an axial direction toward and away from said divider wall in response to changes in differential pressure in said pressure chambers.

5. In a shift mechanism according to claim 4, said shift means including an outer fixed tubular wall, said divider wall extending in an inward radial direction from said fixed tubular wall, and an inner tubular wall extending between said chamber walls and slidable in an axial direction in sealed relation to said divider wall.

6. In a shift mechanism according to claim 5, said inner tubular wall and said chamber walls being of unitary construction and of generally U-shaped cross-sectional configuration, and sealing means between said chamber walls and said outer fixed tubular wall.

7. In a shift mechanism according to claim 6, said pressure applying means including valve means in fluid communication with each of said pressure chambers.

8. In a shift mechanism according to claim 7, said pressure chambers disposed in outer concentric relation to said member to be driven.

9. In a clutch assembly for controlling engagement and disengagement between a first rotatable drive member and second member to be driven in which an axially displaceable first clutch member is connected for rotation to said first drive member and a second clutch member is connected to said second member, and shift means associated with said first clutch member including operator-controlled shift-actuating means for actuating said shift means to advance said first clutch member into and out of engagement with said second clutch member, the improvement comprising:

first releasable locking means associated with said shift means for positively locking said first clutch member in engaged relation to said second clutch member against accidental release therebetween, and second releasable locking means associated with said shift means for locking said first clutch member in disengaged relation to said second clutch member;

release means responsive to said operator means for releasing either of said first or second locking means from their locked positions as a preliminary to engagement and disengagement of said first and second clutch members; and said shift means including a pair of pressure chambers in juxtaposed relation to one another, said release means defined by fluid flow control means for establishing a differential pressure between said pressure chambers causing either of said first or second locking means to be released.

10. In a clutch assembly according to claim 9, each of said locking means including a movable limit stop responsive to a predetermined pressure in an associated pressure chamber to lock said first clutch member in one of said engaged and disengaged positions.

11. In a clutch assembly according to claim 10, said shift means undergoing axial displacement between two end limits of travel in response to the differential pressures established between said pressure chambers, alternate ones of said limit stops movable into registry with a groove at each of said opposite end limits of travel.

12. In a clutch assembly according to claim 11, said release means defined by fluid channels establishing communication between each of said pressure chambers and said grooves to apply fluid under pressure from an associated pressure chamber forcing one of said limit stops out of registry with a groove.

13. In a clutch assembly for controlling engagement and disengagement between a first rotatable drive member and second member to be driven in which an axially displaceable first clutch member is connected for rotation to said first drive member and a second clutch member is connected to said second member, and shift means associated with said first clutch member including operator-controlled shift-actuating means for actuating said shift means to advance said first clutch member into and out of engagement with said second clutch member, the improvement comprising:

first releasable locking means associated with said shift means for positively locking said first clutch member in engaged relation to said second clutch member against accidental release therebetween, and second releasable locking means associated with said shift means for locking said first clutch member in disengaged relation to said second clutch member;

release means responsive to said operator means for releasing either of said first or second locking means from their locked positions as a preliminary to engagement and disengagement of said first and second clutch member; and said first releasable locking means mounted externally of said shift means in the path of movement of said first clutch member, and said release means including a release member extending from said shift means into engagement with said first releasable locking means.

14. In a clutch assembly according to claim 13, said first releasable locking means defined by a ring-like member on said drive member and said first release member having a complementary ring-like portion movable into engagement with said first releasable locking ring to disengage said locking ring from said drive member so that said first clutch member is axially displaceable away from engaged relation to said second clutch member.

15. In a clutch assembly according to claim 14, said second releasable locking means defined by friction plates interposed between said first clutch member and said second clutch member and said release means including a spring member urging said friction plates out of frictional engagement with one another.

16. In a clutch assembly according to claim 15, said locking ring member being of generally cup-shaped configuration and said ring-like release member being complementary to said locking ring and movable along an inclined wall surface of said locking ring to cause said locking ring to expand out of engagement with a groove in said drive member.

* * * * *